United States Patent [19]

Brown et al.

[11] Patent Number: 4,990,213

[45] Date of Patent: Feb. 5, 1991

[54] AUTOMATED TAPE LAMINATOR HEAD FOR THERMOPLASTIC MATRIX COMPOSITE MATERIAL

[75] Inventors: Christopher L. Brown, Arlington, Tex.; Harry C. Ashcraft, Orlando, Fla.; Daniel R. Tichenor, Maple Valley, Wash.; Robert M. Garcia, Laguna Hills, Calif.

[73] Assignee: Northrop Corporation, Hawthorne, Calif.

[21] Appl. No.: 277,587

[22] Filed: Nov. 29, 1988

[51] Int. Cl.⁵ ............................................. B32B 31/18
[52] U.S. Cl. .................................. 156/425; 156/322; 156/323; 156/426; 156/446; 156/459; 156/498; 156/499; 156/522
[58] Field of Search ............... 156/311, 322, 323, 498, 156/499, 522, 523, 574, 577, 425, 426, 446, 459

[56] References Cited

U.S. PATENT DOCUMENTS

| 1,196,796 | 9/1916 | MacLaurin | 156/523 |
| 3,185,614 | 5/1965 | Hartesveldt et al. | 156/498 |
| 4,067,761 | 11/1978 | Shirley | 156/499 |
| 4,285,758 | 8/1981 | Clausen et al. | 156/498 |
| 4,569,716 | 2/1986 | Pugh | 156/523 |

FOREIGN PATENT DOCUMENTS

1024288  6/1983  U.S.S.R. .............................. 156/498

*Primary Examiner*—Caleb Weston
*Attorney, Agent, or Firm*—Terry J. Anderson; Robert B. Block

[57] ABSTRACT

Improved apparatus for dispensing tape of a thermoplastic matrix composite material onto a recipient surface comprising in combination support means for mounting a reel of tape; feed means for unwinding the tape from the reel and advancing it along a path of travel to the mandrel; a guillotine knife in the path of travel for cutting the tape at a predetermined angle with respect to the path of travel; a slotted, box-type preheater for the tape located in the path of travel following the knife for providing heat to the tape; a heated pressure roller located in the path of travel following the pre-heater for providing additional heat to the tape for effecting a process operating temperature and for applying the required pressure to the tape for lamination of the tape onto the recipient surface; cooling means located in the path of travel beyond the pressure roller for reducing the process heat from the laminated tape on the recipient surface and to smoothing it for thereby obtain the desired surface finish; and additional means operatively positioned with respect to the pressure roller, tape and recipient surface for placing an interference film between the pressure roller and the tape to prevent sticking of the tape to the pressure roller. Also disclosed is the method of operating such apparatus.

6 Claims, 7 Drawing Sheets fig. 6 fig. 7

AUTOMATED TAPE LAMINATOR HEAD FOR THERMOPLASTIC MATRIX COMPOSITE MATERIAL

CROSS REFERENCE TO RELATED APPLICATION

Reference is made to copending application entitled METHOD AND APPARATUS FOR WRAPPING THERMOPLASTIC MATRIX COMPOSITE TAPE ON A MANDREL, U.S. patent application Ser. No. 07/277,571, filed concurrently and assigned to the same assignee as the present application.

1. Background of the Invention

This invention relates to an automated tape laminator head for thermoplastic composite material and method of using such head and, more particularly, to an improved laminator head for dispensing thermoplastic matrix composite material onto a rotating mandrel in a pre-programmed fashion for the formation of sheets of pre-form material.

2. Description Of The Background Art

Thermoplastic matrix composite (TMC) materials represent one of the latest materials innovations finding utility in the aero-space industry. These materials consist of fibers,, typically made of graphite or glass, in a thermoplastic resin binder or matrix. Such materials are considered an advance in technology since they provide engineering and manufacturing advantages not possible with conventional aero-space composite materials. Engineering advances provided by such materials include improved damage tolerance providing for longer aircraft part life and improved resistance to chemical solvents and improved material strength in hot, wet, humid operating environments. With regard to manufacturing, the advantages are that pre-processing material refrigeration, normally required for conventional composite materials, is not required. Further, TMC part manufacturing processes have reduced cure cycles of from 6 to 1½ hours down to less than 1 hour.

Thermoplastic resin impregnation with continuous fibers was not possible until the beginning of this decade. The implications of these advantages are obvious to the aircraft manufacturing and design engineer. They involve improved aircraft performance which can be achieved at lower manufacturing costs The U.S. Air Force recognizes the potential of this technology and is actively promoting the development of automatic manufacturing processes to support production of aircraft parts from TMC materials.

Several TMC forming processes under development within the aero-space industry require TMC pre-form sheets. Such pre-form serves as sheet stock or as a billet with the final forming operation. Present pre-form is typically made from strips of TMC material in tape form. Depending on the manufacturer, TMC tape can vary from one-eighth (⅛) inch to twelve (12) inches in width, 0.004 to 0.010 inches in thickness. It can currently be supplied in lengths up to one-hundred and fifty (150) feet.

Manual pre-form fabrication is time consuming. A five (5) by (15) fifteen foot pre-form requires two (2) people working from ten (10) to twelve (12) hours. Such manual fabrication is prone to inconsistencies and defects due to operator mistakes. It is also somewhat dangerous since operators must use a heat wand at temperatures of eight-hundred (800) degrees Fahrenheit or greater. For these reasons, a TMC tape to aircraft part manufacturing process might not be feasible based on known manual pre-form fabrication processes. The need for an automatic pre-form fabrication process is apparent.

The automated TMC tape dispensing laminator head of the instant invention solves the problem of automatically creating a pre-form from vendor supplied TMC tape.

The subject automatic TMC tape laminator head is considered a significant advance since (a) The machine automatically creates a TMC pre-form from vendor-supplied TMC tape; (b) The machine utilizes a simple but novel approach to laminating TMC strips and includes an integrally heated metal roller serves to not only heat the TMC material to its melt temperature (680–800 degrees Fahrenheit) but it also serves to apply the pressure needed to laminate the tape to other pieces of TMC tape; (c) The heated roller enables the machine to process the TMC materials at faster speeds and with less defects than other industry approaches to the automatic TMC tape laminator; and (d) The automated TMC tape laminator head utilizes a conventional interface film dispensing take up capability wherein the interface film prevents the heated roller from sticking to the TMC tape and provides a visually appealing surface finish to the final pre-form.

The background literature discloses many methods and apparatus which apply heat and/or pressure to laminate tape material into a composite product. The background literature, however, is different from the automated TMC tape laminator of the subject invention. More specifically, the patent literature fails to show the structure and function of the instant inventive method and apparatus. Note, for example, Jensen U.S. Pat. No. 2,972,369, Penman U.S. Pat. No. 3,150,023; King U.S. Pat. No. 3,239,399; Bratton U.S. Pat. No. 3,449,193; James U.S. Pat. No. 3,539,438; and Kahn U.S. Pat. No. 4,548,856. Similar disclosures are found wherein the laminate is provided with an intermediate member supplied in roll or cut sheet form. Note Armstrong U.S. Pat. No. 2,793,677; Hannon U.S. Pat. No. 3,143,454; Dresser U.S. Pat. No. 3,309,983; and Columbo U.S. Pat. No. 3,823,047. In addition, similar disclosures are found in Butz U.S. Pat. No. 3,849,226 and Goton U.S. Pat. No. 4,662,973. In these last two (2) patents, however, a release layer is utilized in association with at least one of the sheets being laminated. In no case, however, is there a disclosure of an automated tape laminator head method and apparatus wherein the deposited material is layered upon itself as disclosed herein nor is there any disclosure of thermoplastic composite matrix materials being automatically laminated as in the present invention.

As illustrated by the great number of prior patents and commercial devices, efforts are continuously being made in an attempt to form TMC pre-form materials. None of these previous efforts, however, provides the benefits attendant with the present invention. Additionally, prior techniques and apparatus do not suggest the present inventive combination of component elements and method steps, arranged and configured as disclosed and claimed herein. The present invention achieves its intended purposes, objectives and advantages over the prior art through a new, useful and unobvious combination of method steps and component elements which are simple to use, with the utilization of a minimum number of functioning parts, at a reasonable cost to manufacture and utilize and by employing only readily available materials.

Therefore, it is an object of this invention to provide an improved automated tape laminator head for thermoplastic composite material which includes apparatus for dispensing a tape of thermoplastic matrix composite material onto a recipient surface moving in a pre-programmed fashion for the formation of sheets of pre-form material on the recipient surface.

It is another object of this invention to provide an improved method of utilizing a tape laminator head in the formation of thermoplastic matrix composite materials.

It is a further object of the invention to dispense lengths of thermoplastic matrix composite material in tape form onto a rotating mandrel for the fabrication of pre-form sheets.

Lastly, it is an object of this invention to form sheets of thermoplastic matrix composites more accurately, conveniently and economically through the utilization of an automated tape laminator head.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purposes of summarizing the invention, the invention may be incorporated into an improved apparatus for dispensing tape onto a recipient surface comprising in combination support means for mounting a reel of tape; feed means for unwinding the tape from the reel and advancing it to the mandrel; a pre-heater for the tape for providing initial heat to the tape; a heated pressure roller for providing additional heat to the tape and for applying the required pressure to the tape for lamination of the tape onto the recipient surface; cooling means for reducing the heat of the laminated tape on the recipient surface; and additional means operatively positioned with respect to the pressure roller, tape and recipient surface for placing an interference film between the pressure roller and the tape.

The apparatus further includes a guillotine knife in the path of travel of the tape for cutting the tape at a predetermined angle following the lamination of the recipient surface. The cooling means contacts the tape on the recipient surface for smoothing it to thereby obtain the desired surface finish. The film is of an adhesive material to prevent sticking of the tape to the pressure roller, preferably Kapton. The tape is of a thermoplastic matrix composite material and is laminated onto the recipient surface so that the tape is partially disposed over a previously laminated segment of tape.

The invention may further be incorporated into apparatus for dispensing tape of a thermoplastic matrix composite material onto a recipient surface comprising in combination support means for mounting a reel of tape; feed means for unwinding the tape from the reel and advancing it along a path of travel to the mandrel; a guillotine knife in the path of travel for cutting the tape at a predetermined angle with respect to the path of travel; a slotted, box-type pre-heater for the tape located in the path of travel following the knife for providing heat to the tape; a heated pressure roller located in the path of travel following the pre-heater for providing additional heat to the tape for effecting a process operating temperature and for applying the required pressure to the tape for lamination of the tape onto the recipient surface; cooling means located in the path of travel beyond the pressure roller for reducing the process heat from the laminated tape on the recipient surface and to smoothing it for thereby obtain the desired surface finish; and additional means operatively positioned with respect to the pressure roller, tape and recipient surface for placing an interference film between the pressure roller and the tape to prevent sticking of the tape to the pressure roller.

Lastly, the invention may be incorporated into a method for dispensing tape of a thermoplastic matrix composite material onto a recipient surface comprising in combination the steps of supporting a reel of tape in operative proximity to the recipient surface; unwinding the tape from the reel and feeding it along a path of travel to the mandrel; pre-heating the fed tape along the path of travel between the reel and the recipient surface; applying heat and pressure to the tape fed from the preheater by a heated pressure roller in the path of travel at the recipient surface for the lamination of the tape onto the recipient surface; cooling the tape in the path of travel beyond the pressure roller and smoothing the freshly laminated tape on the recipient surface; and placing an interference film between the pressure roller and the tape to prevent sticking of the heated tape to the pressure roller.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures and method steps for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIGS. 2, 3 and 4 are a plan view, side elevational view and front elevational view of the headstock assembly;

FIG. 8 is a schematic illustration of the controller for the tape laminator system.

FIG. 9 is a front elevational view of the tape laminator system shown in FIG. 1.

Similar referenced characters refer to similar parts throughout the several Figures.

DETAILED DESCRIPTION OF THE INVENTION

Figure 1:
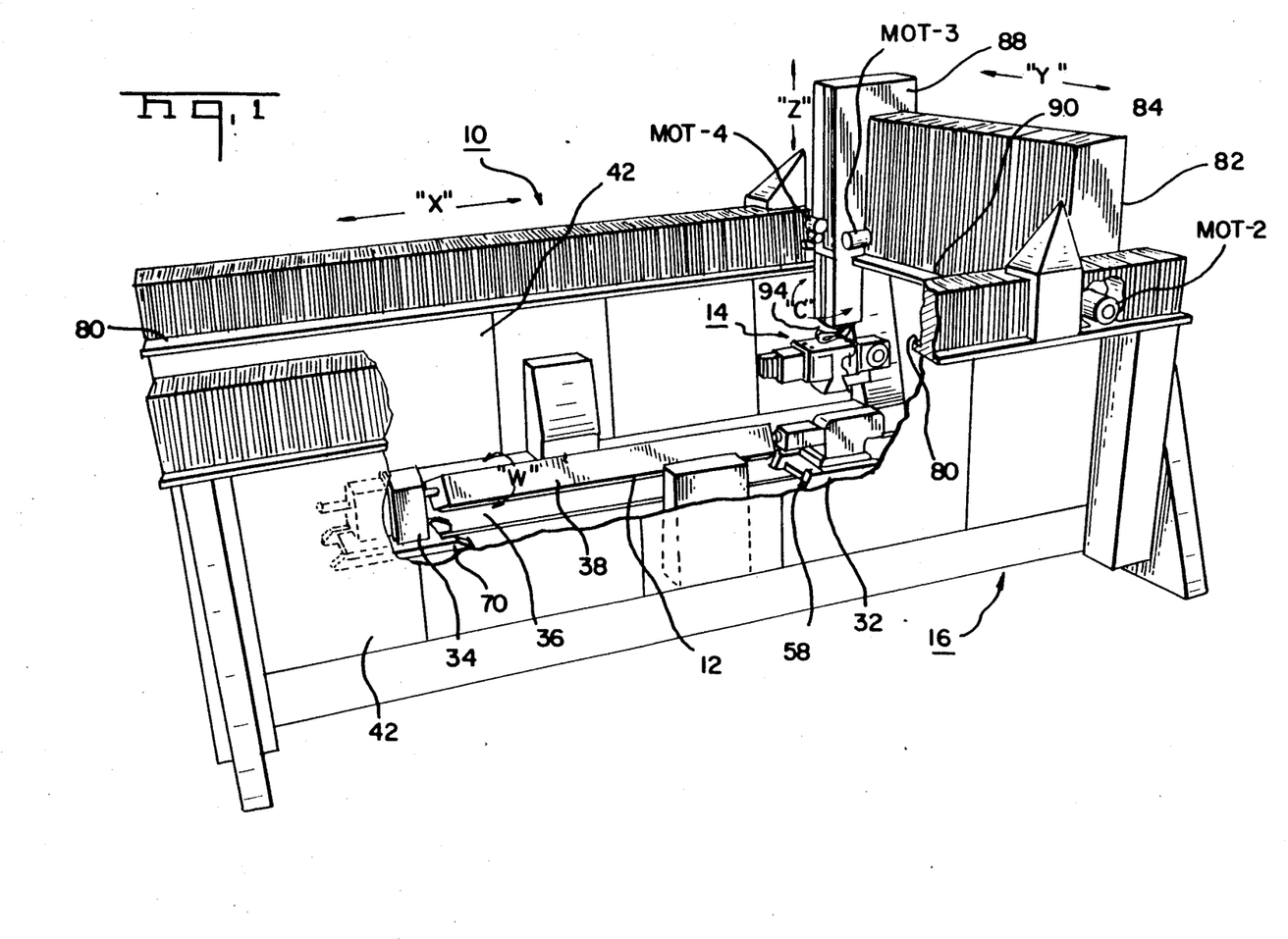
FIG. 1 is a perspective illustration of a the tape laminator system constructed in accordance with the principles of the present invention.

With reference to the Figures, there is shown an improved tape laminator system 10 constructed in accordance with the principles of the present invention. The entire tape laminator system 10 is shown in FIG. 1. It is configured and operated for laminating tape of thermoplastic matrix composite (TMC) material onto a recipient surface such as a mandrel 12. TMC materials are defined as engineering thermoplastic materials consisting of continuous, engineering fibers, as opposed to randomly oriented fibers, embedded in the thermoplastic resin binder or matrix. The fibers and resins may preferably be supplied by the vendor as a single uniform product form.

The system 10 consists of the tape support assembly 14 and the mandrel support assembly 16. The tape support assembly 14 includes a head 18 for feeding tape 20 onto the mandrel 12. The mandrel support assembly 16 consists of a five (5) axis gantry positioner 20. The two assemblies 14 and 16 interface through the control assembly 22, preferably a computer numerical control (CNC), with a controller 24 such as an AllenBradley controller, through digital input/output (1/0) lines and additional controls 26. Software for the system operation is preferably resident in the CNC controller.

Figure 2:
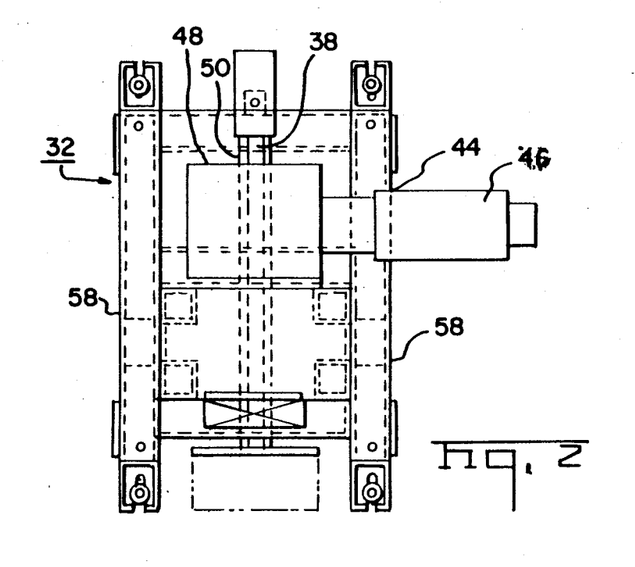
Figure 4:
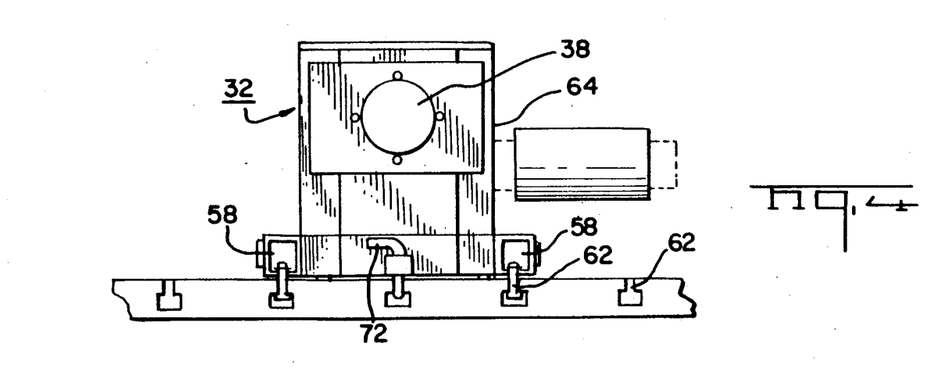

The mandrel support assembly 16 is a lathe-type device which includes a bed 30, a headstock assembly 32 and tailstock assembly 34. The headstock and tailstock assemblies constitute a cradle 36 for supporting and rotating the mandrel 12 about its longitudinal axis 38. Side walls 42 extend upwardly from the sides of the bed 30. The headstock assembly 32 is more specifically seen in FIGS. 2, 3 and 4. It includes a weldment 44 which supports a DC servo motor (MOT-1) 46, gear box 48, drive shaft 50 as well as a chuck 52 which will support and rotate the mandrel 12 while its peripheral surface 56 is being laminated by the tape 20. The headstock assembly 32 also includes a pair of spaced support blocks or shoes 58 receiving bolts in channels slots 62 at the forward and rearward ends for securing the shoes 58 and entire headstock assembly 32 in parallel the longitudinal channels or slots 62 of the bed. Upstanding from the supports is a frame 64 having secured thereto, in laterally offset relationship, the gear box 48 and motor 46 for rotating the drive shaft 50. At the end of the drive shaft 50 facing the central region of the assembly is a plate 66 having bolts for secure element to one end of the mandrel 12.

Figure 5:
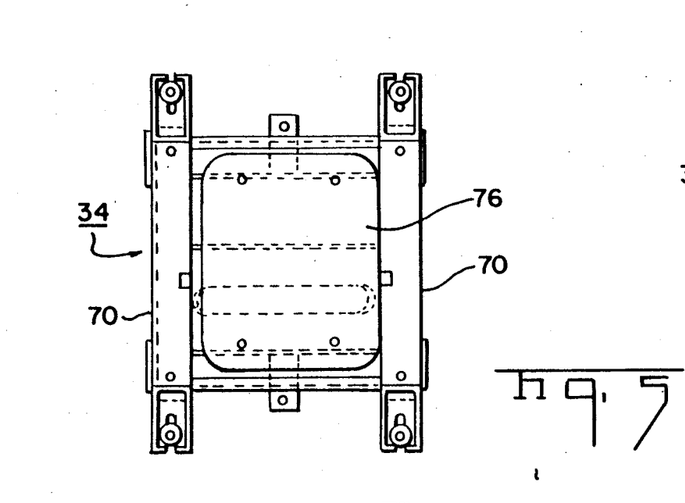
FIGS. 5, 6 and 7 are a plan view, side elevational view and front elevational view of the tailstock assembly.
Figure 6:
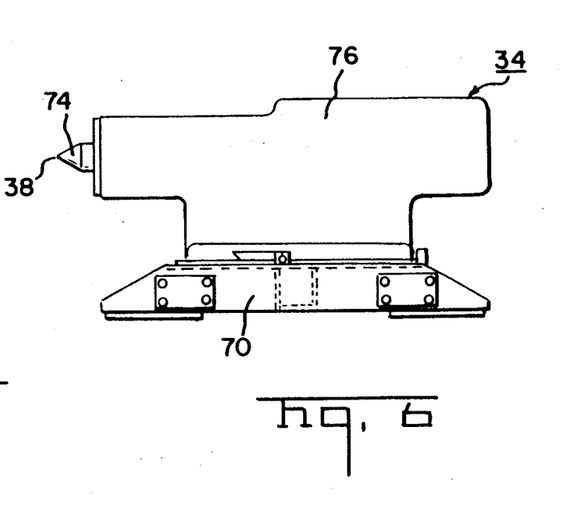
Figure 7:
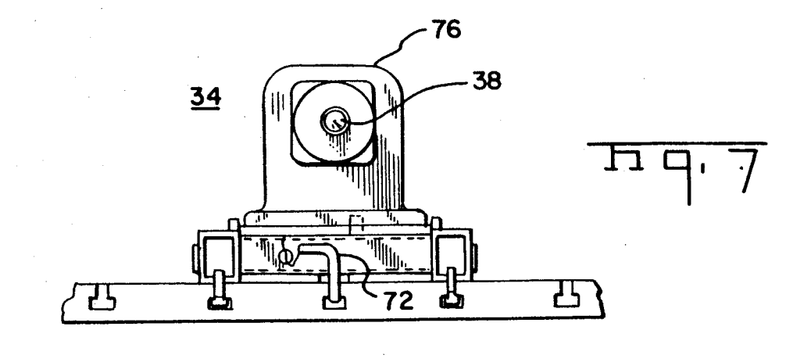

Also adjustably secured to the bed 30 is a tailstock assembly 34. Note FIGS. 5, 6 and 7. The tailstock assembly 34 also is provided with a pair of longitudinal extending shoes 70 with slots at each end for adjustable securement to the channels or slots 62 in the bed through a bolt arrangement. An alignment pin 72 is centrally located front and back of the tailstock 34 as well as the headstock 32. The tailstock 34 includes a central rotatable pin 74 for receiving the end of the mandrel 12 remote from the headstock 32 and is freely rotatable on a bearing assembly beneath frame 76. In this manner activation of the motor 46 under command of the controller assembly 22 will effect the appropriate timed rotational sequence of the mandrel in operative relationship with the tape support assembly 14.

Upstanding from opposite side edges of the bed are the side walls 42, the upper surfaces 80 of which support the ends 82 of a reciprocating gantry 84 movable along a first axis from one end of the bed 30 to the other parallel with the centerline 38 of the mandrel 12. Movement is effected through a motor MOT-2 and chain adjacent one end of one side walls. Operation of the motor MOT-2 and movement of the gantry 84 are controlled by the control assembly 22 for operation in a sequence coordinated with the rotation of the mandrel 12 and dispensing of the tape by the tape support assembly 14.

Slidably coupled with and with respect to the gantry 84 is the tool plate 88 which is adapted for movement along the first axis with the movement of the gantry 84. A third drive means MOT-3 is provided for moving the tool plate 88 along rail 90 of the gantry 84 along a second axis, transverse with respect to the first axis toward and away from the elevated sides 42.

A chuck 94 is secured within, and slidably coupled to the tool plate 88. The chuck 94 is adapted for movement with the tool plate 88 in the first and second axes. A fourth drive means MOT-4 is coupled to the chuck 94 for moving the chuck 94 along a third axis toward and away from the bed. The third axis is transverse to the first and second axes. The tape lamination head assembly 14 is adjustably secured with respect to the lower face of the chuck 94.

Figure 11:
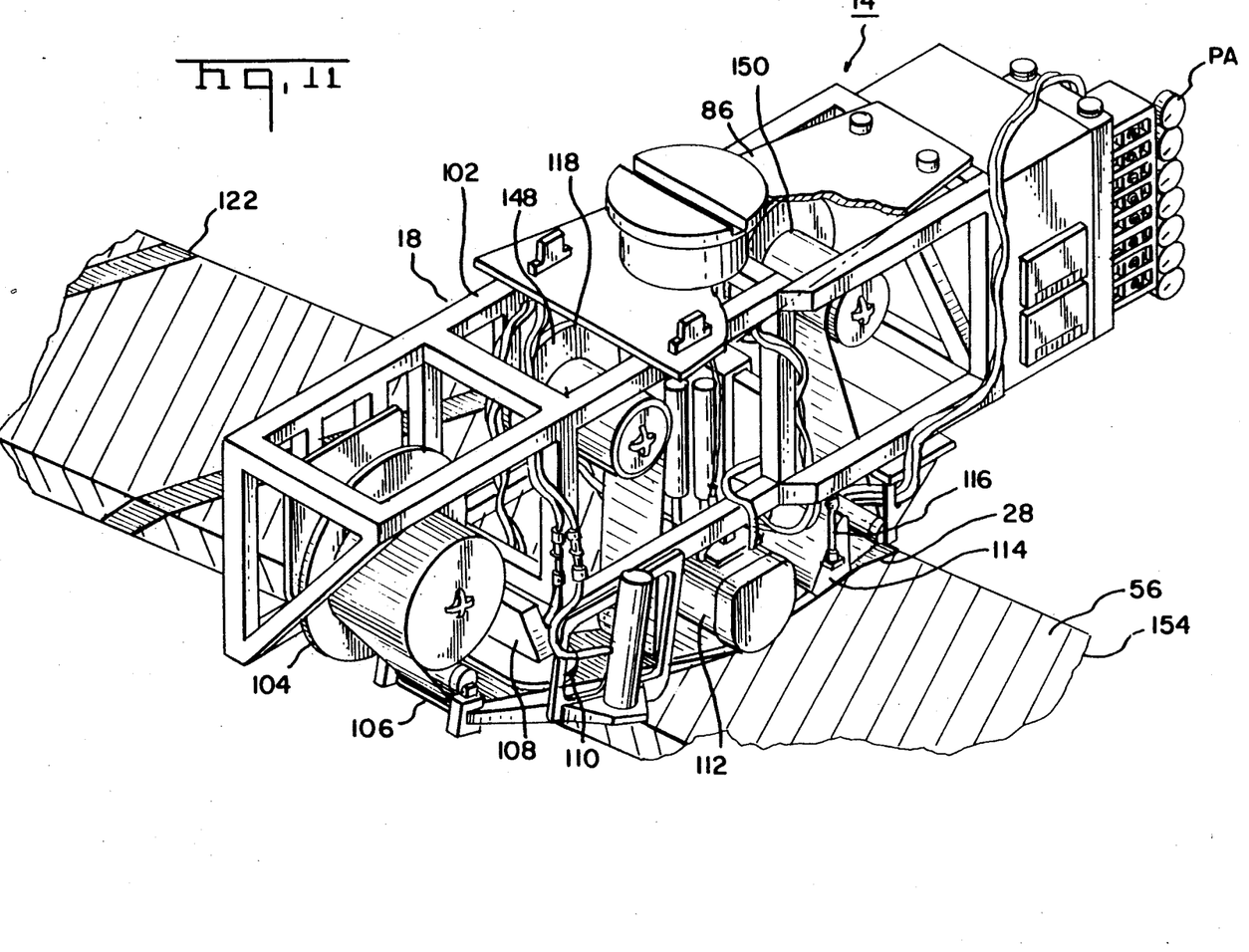
FIG. 11 is an enlarged perspective illustration of the tape laminator head.
Figure 12:
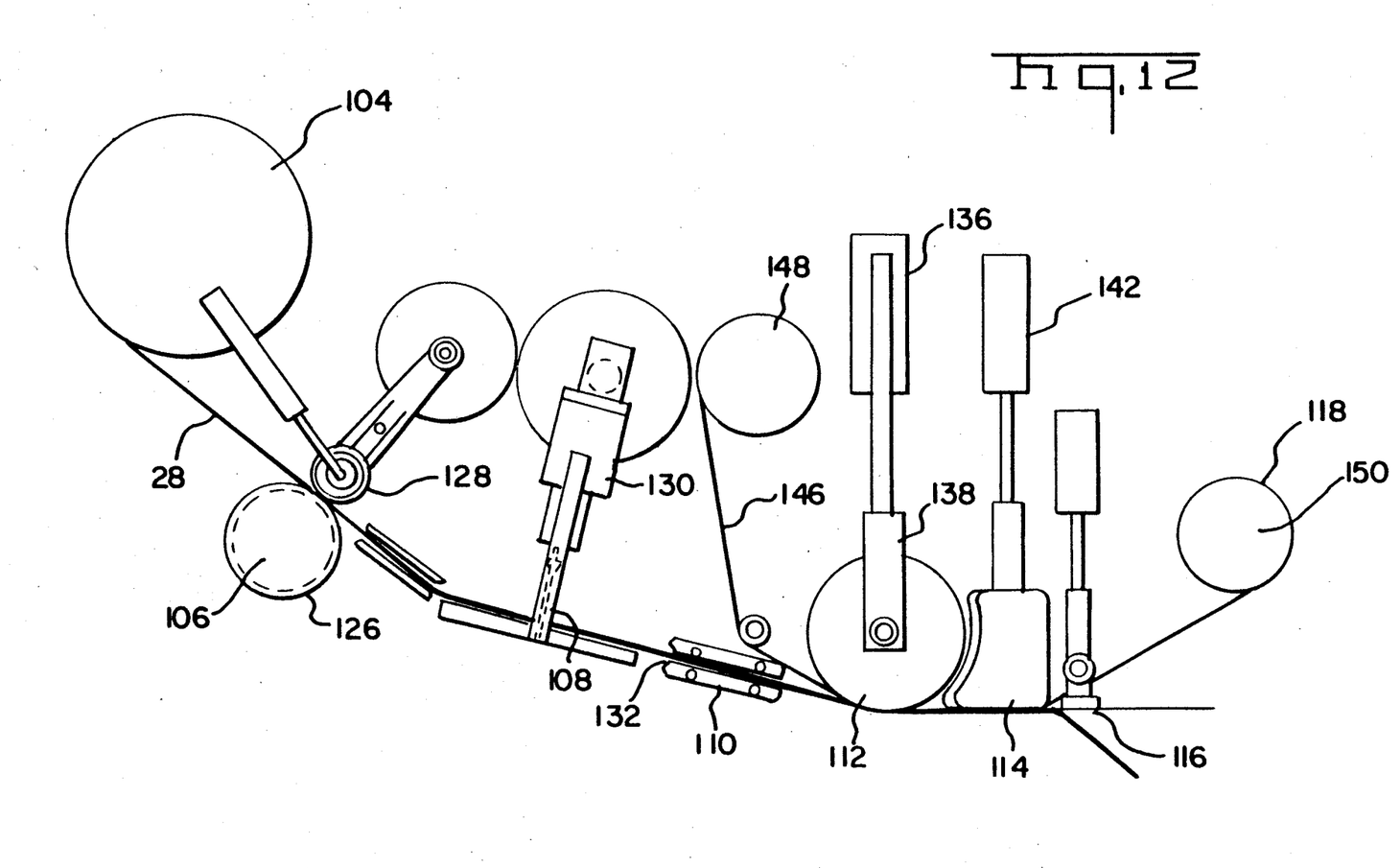
FIG. 12 is a partially schematic front elevational view of the tape laminator head of FIG. 11.

The main components of the tape support assembly 14 supported by the chuck 94 is the laminator head 18 which includes a base plate 102 and a tape supply spool or reel 104, a tape advance mechanism 106, a variable angle shear or knife 108, a pre-heater 110, a heated pressure roller 112, a cold shoe 114, a temporary starting clamp 116, and a film payout and take-up system 118. These components are mounted on a framework on the base plate 102 which is attached to the chuck 94, tool plate 88 and gantry 84 preferably standardized. The chuck 94, tool plate 88 and gantry 84 have the necessary mechanical movement and alignment hardware, electrical connectors and pneumatic actuator, PA, for effecting the desired programmed functions with the mandrel 12 as will be described hereinafter. Temperature controls and pneumatic valving, of generally standard design, are mounted on the laminator head 18 while motor controls are mounted in the cabinet with the controller assembly 22.

The supply spool 104 holds the tape, shown as three (3) inch wide tape 20, of a thermoplastic matrix composite (TMC) material which is to be bonded in layers to form a thick sheet or panel 122 constituting the preform sheets. The supply spool 104 is back driven by a gear motor to hold tension on the tape as it is pulled from the spool and bonded to the panel. The amount of tension is adjustable. Both three (3) inch and six (6) inch inside diameter supply spools can be accommodated.

The tape advance mechanism 106 consists of an idler roller 126 and a driven pinch roller 128. The pinch roller 128 is actuated toward the idler 126 to clamp the tape 20 and feed it through the knife 108 and pre-heater 110 and under the heated pressure roller 112 and cold shoe 114 to the start clamp 116. The pinch roller 128 is normally retracted for a free tape path from the spool 104 to the mandrel 12.

The variable angle knife 108 is a mechanical guillotine-type shear which can be rotated plus or minus sixty (60) degrees from a right angle tape cut. The shear rotation is driven by a servo motor for programmed shear angles. The shear knife is actuated by dual air cylinders 130 through the pneumatic actuators, PA.

The pre-heater 110 is used for thermal transfer to the new tape 20 to warm it before it contacts the heated roller 112 and mandrel 12. It is a box-type arrangement with a slot 132 therethrough and with a flat heater on the top and on the bottom sides. It normally operates at about five-hundred (500) degrees Fahrenheit.

The heater pressure roller 112 is preferably four (4) inches in diameter and has a plurality, preferably six (6), internal cartridge heaters which bring the roller surface temperature to between approximately seven-hundred and fifty (750) to eight-hundred and fifty (850) degrees Fahrenheit under normal operation. Air cylinder actuators 136 press the roller 112 against the surface so that the combination of heat and pressure causes the new tape 20 to bond to the surface of the mandrel 12 below. Various surface pressures may be selected depending upon the resilience of the bonding surface. The roller is insulated with a metal radiation shield and ceramic conduction end caps to retain heat and maintain an even temperature distribution. The roller assembly is supported on linear bearings 138 for retraction from the surface. The roller itself is planar compliant in order to maintain flat contact with the surface.

Following the heated roller 112 is a cold shoe 114 which cools and smooths the freshly laid tape to obtain the proper surface finish. This is a conventional aluminum cavity through which chilled water passes to sink the heat from the tape surface. The cold shoe is retractable through pneumatic cylinder 142, and the shoe pressure against the surface is adjustable independently from the roller pressure.

The start clamp 116 is used only temporarily during the start of a tape lamination run to hold the tape 20 against the surface of the mandrel 12 and keep the end from slipping as the laminator head is initially moved. After a short travel of the laminator head 18 and after the tape bonding under the roller 112 has begun, the clamp 116 is retracted and remains out of the way during the remainder of the lamination pass.

The film system 118 is used to prevent plastic material transfer from the TMC tape 20 to the surface of the heated roller 112. The film 146, preferably Kapton, is supplied from a payout spool or reel 148 with a clutch drag for tensioning. The film passes below the roller 112 between the roller and the tape 20, and is removed from the surface onto a driven, back tensioned take-up spool or reel 150. The Kapton film 146, at three and one-half (3½) inches, is slightly wider than the TMC tape 20 to provide some edge overlap. The Kapton is reusable by exchanging the spools when the payout spool is empty.

Figure 10A:
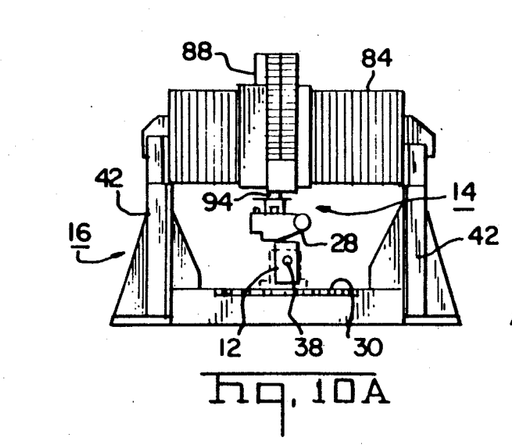
FIGS. 10A, 10B, 10C, 10D, 10E and 10F are front elevational views similar to that shown in FIG. 9 but illustrate the movement of the head and the mandrel.
Figure 10B:
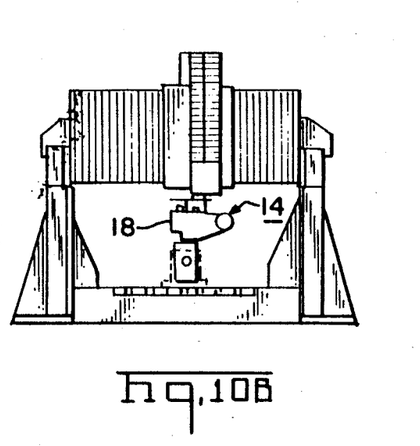
Figure 10C:
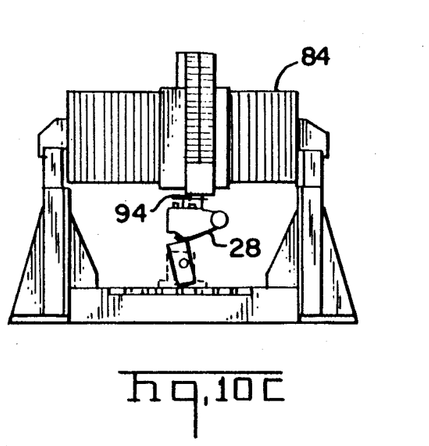
Figure 10D:
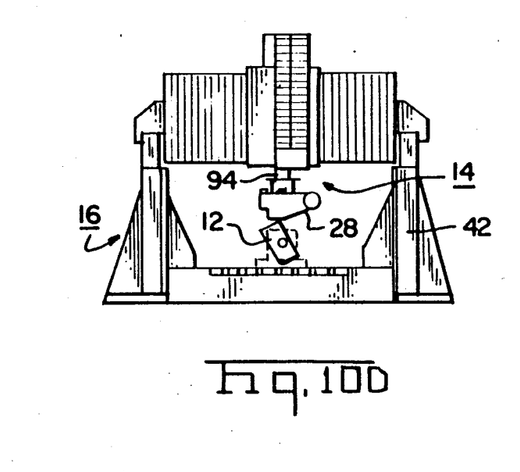
Figure 10E:
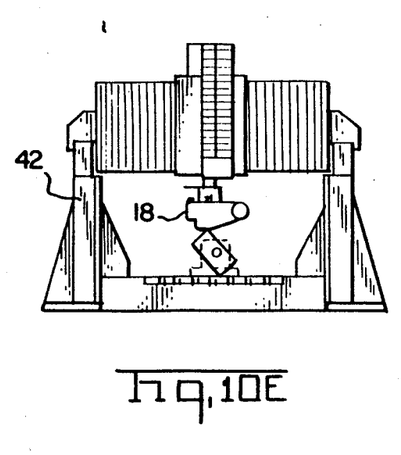
Figure 10F:
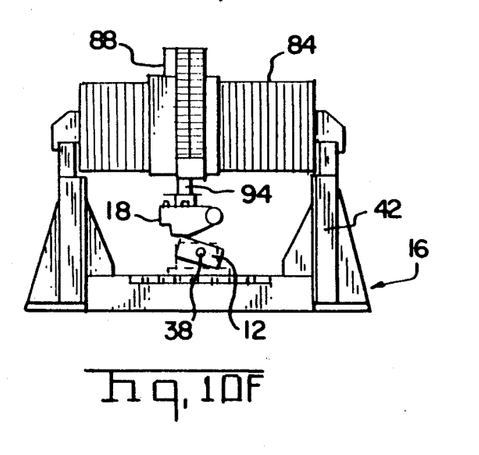

In operation and use, the movement of the various components can be understood with reference to FIGS. 10A-10F inclusive. In FIG. 10A, the mandrel 12 is rotated to fixedly position one flat face of the mandrel 12 immediately beneath the head. In this position the tape 20 feed is located above one edge of the mandrel 12 and the tape head 18 lowers with the mandrel 12 stationary. In FIG. 10B the tape head 18 moves laterally in a first direction in a plane parallel with the surface receiving the tape 20 to apply tape to the upwardly positioned horizontal surface of the mandrel. Motors 1 and 4 are inactivated so the mandrel is fixed and the head is not raising or lowering. Motors 2 and 3 are activated to move the head across the mandrel surface and along its length for the diagonal application of tape. Initiation of the mandrel is rotated by the controller. Before the roller reaches the corner, the tape head 18 raises from the surface of the mandrel 12 so as to allow no interference as caused by rotation of the mandrel. At the same time the head moves in a second direction opposite from the first. With the head 18 raised, the compaction pressure cannot distort the fibers of the tape 20 at the corners of the mandrel 12. As the mandrel 12 rotates from fifteen (15) to thirty (30) degrees, the head once again lowers to contact the mandrel for the application of tape around the corner. During the cornering, motors 1, 3 and 4 are activated to rotate the mandrel, to raise and lower the head and to move the head from one side of the bed to the other. Motor 2 is inactivated so that the head remains at the same location along the centerline of the mandrel. The mandrel 12 then continues its rotation through forty-five (45), seventy-five (75) to ninety (90) degrees where the second surface of the mandrel is in an upwardly disposed horizontal relationship with the head 18 located above the mandrel 12. The head 12 then moves to deposit tape 20 on the facing surface of the mandrel. Thereafter, steps 10A through 10F are repeated for the application of the tape 20 around the second corner and the second drive of the mandrel 12. The process is then repeated in a continuing cycle of operation with tape dispensing and the head moving appropriately laterally of the mandrel for the deposition of the tape 20 for the generation of the pre-form fabric 56.

The steps to tape wrapping and the process parameters required to perform those steps include first layering the mandrel 12 with an insulator 154 consisting of a 120 glass cloth. The mandrel is preferably a vacuum structure penetrations for mechanical hold down of the Kapton film 146 referred to in the next following step.

Thereafter, the mandrel 12 is then layered with a Kapton film 146 used for first ply adhesion. The material makes a mechanical bond to the film.

For first ply adhesion the roller 112 must be set at about eight-hundred and sixty (860) degrees Fahrenheit and the pre-heater set at about six-hundred (600) degrees Fahrenheit. The pressure for the roller 112 is about one-hundred and twenty (120) psi and cold shoe pressure is about sixty (60) psi. The first ply speed should be set at about eighty (80) inches per minute. If a higher consolidation is desired, the speed should be reduced by about ten (10) inches per minute for each additional ply until about fifty (50) inches per minute is achieved. This will give the material more time above the glass transition temperature which will give high consolidation levels approaching ninety (90) percent.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. Apparatus for dispensing thermoplastic composite tape onto a recipient surface of a mandrel comprising in combination:

support means for mounting a reel of tape;

feed means for unwinding the tape from the reel and advancing it to the mandrel;

a pre-heater for the tape for providing initial heat to the tape;

heated pressure roller means for providing additional heat to the tape to heat said tape to the laminating process operating temperature above the glass transition temperature and for applying the required pressure to the tape for lamination of the tape onto the recipient surface;

means for maintaining a back tension on the heated tape as it is applied to the mandrel;

cooling shoe means for reducing the heat of the laminated tape on the recipient surface to prevent delamination and for smoothing the surface of the laminated tape, and additional means operatively positioned with respect to the pressure roller, tape and recipient surface for placing a high temperature interference film between the pressure roller and the tape to prevent tape from sticking the heated pressure to roller as it is laid.

2. The apparatus as set forth in claim 1 and further including a guillotine knife in the path of travel of the tape for cutting the tape at a predetermined angle following the lamination of the recipient surface.

3. The apparatus as set forth in claim 1 wherein the tape is of a thermoplastic matrix composite material and is laminated onto the recipient surface so that the tape is partially disposed over a previously laminated segment of tape.

4. The apparatus as set forth in claim 1 wherein the film is of an adhesive material to prevent sticking of the tape to the pressure roller.

5. The apparatus as set forth in claim 4 wherein the film is Kapton.

6. Apparatus for dispensing tape of a thermoplastic matrix composite material onto a recipient surface of a mandrel comprising in combination:

support means for mounting a reel of tape;

feed means for unwinding the tape from the reel and advancing it along a path of travel to the mandrel;

a guillotine knife in the path of travel for cutting the tape at a predetermined angle with respect to the path of travel;

a slotted, box-type pre-heater for the tape located in the path of travel following the knife for providing heat to the tape;

a heated pressure roller located in the path of travel following the pre-heater for providing additional heat to the tape for effecting a process operating temperature above the glass transition temperature of the tape and for applying the required pressure to the tape for lamination of the tape onto the recipient surface;

means for maintaining a back tension on the heated tape as it is applied to the mandrel;

cooling shoe mans located in the path of travel beyond the pressure roller for reducing the process heat from the laminated tape on the recipient surface to prevent delamination and for applying a pressure to the tape for smoothing it for thereby obtain the desired surface finish; and additional means operatively positioned with respect to the pressure roller, tape and recipient surface for placing a high temperature interference film between the pressure roller and the tape to prevent sticking of the tape to the pressure roller.

* * * * *